US012559355B2

(12) United States Patent
Kunzmann

(10) Patent No.: US 12,559,355 B2
(45) Date of Patent: Feb. 24, 2026

(54) PLANT FOR FILLING AND CLOSING CANS UNDER HYGIENIC CONDITIONS

(71) Applicant: Hygentile AG, Staufen (CH)

(72) Inventor: Andreas Kunzmann, Staufen (CH)

(73) Assignee: Hygentile AG, Staufen (CH)

( * ) Notice: Subject to any disclaimer, the term of this patent is extended or adjusted under 35 U.S.C. 154(b) by 0 days.

(21) Appl. No.: 18/738,354

(22) Filed: Jun. 10, 2024

(65) Prior Publication Data

US 2025/0019219 A1 Jan. 16, 2025

Related U.S. Application Data

(63) Continuation of application No. 17/622,536, filed as application No. PCT/EP2020/067776 on Jun. 25, 2020, now Pat. No. 12,006,200.

(30) Foreign Application Priority Data

Jun. 25, 2019 (EP) .................................... 19182337

(51) Int. Cl.
*B67C 7/00* (2006.01)
*B65B 7/28* (2006.01)
(Continued)

(52) U.S. Cl.
CPC .............. *B67C 7/004* (2013.01); *B65B 7/285* (2013.01); *B67C 3/007* (2013.01); *B67C 3/202* (2013.01);
(Continued)

(58) Field of Classification Search
CPC ......... B67C 7/004; B67C 7/285; B67C 3/007; B67C 3/202; B67C 3/24; B67C 3/26; B67C 7/0086; B67C 2003/2657; B67C 2003/2697; B67C 2007/006; B67C 2007/0066
(Continued)

(56) References Cited

U.S. PATENT DOCUMENTS 5,054,265 A * 10/1991 Perigo .................... B21D 51/32 53/425
6,045,313 A 4/2000 Wu
(Continued)

FOREIGN PATENT DOCUMENTS

DE 44 24 098 A1 1/1996
DE 197 39 326 C1 4/1999
(Continued)

OTHER PUBLICATIONS

International Search Report Corresponding to PCT/EP2020/067776 mailed Aug. 27, 2020.
(Continued)

*Primary Examiner* — Jacob A Smith

(57) ABSTRACT

A plant (1) for filling and closing cans (2) under hygienic conditions which comprises a hygienic compartment (3), a lid applying device (7) and an inlet (30) for a filling material. The lid applying device (7) is arranged in the hygienic compartment (3) and the inlet (30) is formed on the hygienic compartment (3). When used as intended, one or more cans (2) can be assigned to the hygienic compartment (3) and the hygienic compartment (3) can be moved together with the can(s) (2) in the system (1).

17 Claims, 14 Drawing Sheets

(51) Int. Cl.

| | |
|---|---|
| ***B67C 3/00*** | (2006.01) |
| ***B67C 3/20*** | (2006.01) |
| ***B67C 3/24*** | (2006.01) |
| ***B67C 3/26*** | (2006.01) |

(52) U.S. Cl.

CPC .................. *B67C 3/24* (2013.01); *B67C 3/26* (2013.01); *B67C 7/0086* (2013.01); *B67C 2003/2657* (2013.01); *B67C 2003/2697* (2013.01); *B67C 2007/006* (2013.01); *B67C 2007/0066* (2013.01)

(58) Field of Classification Search

USPC ... 53/426, 167, 281, 425, 432, 131.1, 131.2, 53/235

See application file for complete search history.

(56) References Cited

U.S. PATENT DOCUMENTS

| | | | | |
|---|---|---|---|---|
| 9,133,007 | B2 | 9/2015 | Clüsserath | |
| 2005/0188651 | A1 * | 9/2005 | Clusserath | B67C 7/002 53/167 |
| 2010/0077701 | A1 | 4/2010 | Ehmer | |
| 2012/0151873 | A1 | 6/2012 | Niehr | |
| 2013/0112315 | A1 | 5/2013 | Clusserath | |
| 2015/0052852 | A1 | 2/2015 | Achhammer et al. | |
| 2018/0215600 | A1 | 8/2018 | Yuse et al. | |

FOREIGN PATENT DOCUMENTS

| | | | | |
|---|---|---|---|---|
| EP | 1468959 | A2 * | 10/2004 | B67C 7/0073 |
| EP | 1 561 722 | A1 | 8/2005 | |
| JP | 2005-126077 | A | 5/2005 | |
| WO | 2011/029609 | A2 | 3/2011 | |

OTHER PUBLICATIONS

Written Opinion Corresponding to PCT/EP2020/067776 mailed Aug. 27, 2020.

International Preliminary Report on Patentability corresponding to PCT/EP2020/067776 mailed Dec. 28, 2021.

* cited by examiner

PLANT FOR FILLING AND CLOSING CANS UNDER HYGIENIC CONDITIONS

The invention relates to a machine, a method, and a lid-applying device for filling and sealing cans under hygienic conditions according to the pre-characterizing clauses of the independent claims.

Various machines for filling and/or sealing containers are known from the prior art. The purpose of the machines is to automatically fill and seal a large number of containers. A particular requirement is to fill and seal cans in as little time as possible and under the most hygienic conditions.

A machine for the sterile filling of bottles or similar containers with products, in particular beverages, is known from the document WO 2011/029609. For this purpose, containers are introduced into a housing which forms a sterile space. The housing comprises both a device for filling the containers and a device for sealing the containers. In a first step, the containers are filled with the corresponding beverage and are then in a second step transferred by means of a container transfer device to the device for sealing. This procedure requires a lot of time and entails a lot of effort and high costs to convert the corresponding space into a sterile environment.

Furthermore, a device for handling beverage containers is known from the document DE 197 39 326 which surrounds the beverage container during the handling with a housing is brought under sterile conditions. For this purpose, the beverage containers situated on a transport belt are separated from one another by gates which form a closed space under sterile conditions when the beverage containers are introduced into the device. A disadvantage of this device is that the transport belt has to be stopped for the duration of the handling.

A device for sealing containers is known from DE 44 24 098. During the movement of the container along the transport path, the sealing cap of the container mouth is supplied such that an access gap, which forms a handling zone, is situated between the container mouth and the sealing cap. Sterile handling is performed in the handling zone in the region of the container mouth upstream from the sealing process. In this case, only the sealing process of the containers takes place under sterile conditions. This has the disadvantage that the degree of sterilization as a whole during the filling process is not particularly high and in some circumstances the shelf life of the filling material is not long.

The object of the present invention is to provide a machine for filling and sealing cans which overcomes the disadvantages of the prior art and in particular to provide a machine, a method, and a lid-applying device which fills and seals beverage cans in a very short time and under the most hygienic conditions.

This object is achieved by a machine, a method, and a lid-applying device for filling and sealing cans as claimed in the independent claims.

According to the invention, the machine for filling and sealing cans under hygienic conditions comprises a hygienic compartment, a lid-applying device, and an inlet opening for a filling material. The lid-applying device is arranged in the hygienic compartment and the inlet opening is formed on the hygienic compartment. During normal use, one or more cans can in each case be associated with the hygienic compartment and the compartment can be moved in the machine together with the can or cans.

In this connection, sealing the can is understood to mean at least applying a can lid to the can. By holding the lid down on the can or alternatively connecting the can lid to the can by means of current joining techniques, preferably by seaming, it is ensured that the can remains sealed for further processing.

The cans which are to be filled and sealed in this machine are cans which are filled with a liquid and/or solid filling material. They are preferably beverage cans which are filled with a liquid filling material, in particular beverages.

A hygienic compartment is understood to mean here a space which is closed to the environment and under hygienic conditions. Hygienic conditions are understood to mean here conditions which correspond to at least hygiene class I as classified by the VDMA (No. 2/2000, 3rd edition, 2016), but preferably correspond to hygiene class 3 or above as classified by the VDMA (No. 2/2000, 3rd edition, 2016).

Alternatively, the lid-applying device can be formed completely or partially outside the hygienic compartment.

The advantages of the present machine consist in the cans being filled and sealed in such a way that their filling material has a long shelf life and at the same time filling and sealing are possible in a very time-efficient fashion. In addition, under these circumstances pressure conditions can be optimized such that rapid filling and applying of lids can be effected even in the case of foaming and powdered substances. An elevated pressure of up to 65 bar, preferably between 0-40 bar, is used.

A filling device is preferably formed at the inlet opening or a filling device can be introduced into the inlet opening.

This has the advantage that the can can be filled and sealed in a time-efficient fashion during the transporting of the can.

The filling device preferably comprises a flow sensor for determining the filling amount.

Alternatives for the flow sensor for determining the filling amount can be a fill level sensor which identifies when a predetermined fill level of the filling material has been reached, or a weighing device which determines when a predetermined weight has been reached.

The advantage of such a fill level sensor or one of the alternatives indicated is that automatic and reliable filling of the cans with always the same amounts of filling material is possible.

The lid-applying device preferably comprises a lid-transporting device and a holding-down arrangement and a seaming device. The lid-applying device can, however, also comprise a lid-transporting device and a holding-down arrangement or a lid-transporting device and a seaming device.

The lid-transporting device picks up the lid with the aid of a pick-up mechanism and transports the lid to the can. The pick-up mechanism can be a suction mechanism, a magnetic mechanism, or alternatively a guide system through which the lid is moved.

Alternatively, the seaming device can be arranged completely or partially outside the hygienic compartment.

The advantage of the said lid-applying device consists in the fact that the lid is fed to the can automatically and in the meantime various processes, such as cleaning the lid or aligning the lid, can be performed on the lid.

An airlock compartment is preferably arranged on the hygienic compartment.

The advantage of the airlock compartment is that, during the process of filling the can, the lid which is applied to the can at a later point in time can be prepared early on. Processes such as cleaning or aligning the lid, etc can be included in the preparation.

Lids are preferably transported with the aid of the lid-transporting device on a transport path from the airlock compartment into the hygienic compartment.

Transporting the lid through an airlock compartment has the advantage that various processes such as cleaning, aligning the lid, etc can be performed on the transported lid.

One or more entrances and exits are preferably arranged on the airlock compartment.

An airlock compartment with one or more entrances and exits is advantageous, on the one hand, in order to actively connect the airlock compartment to the hygienic compartment but also, on the other hand, in order to be able to introduce devices or lids into the airlock compartment.

The airlock compartment advantageously comprises a cleaning device.

A cleaning device which is used here is used to partially or completely clean and disinfect the lid and/or the compartment, and/or parts thereof. The cleaning device can comprise introducing gaseous, liquid, or solid cleaning agents or can function with the aid of particle radiation or electromagnetic radiation or a mechanical device. Mechanical devices can be brushes, sponges, scrapers, etc.

The advantage of the arrangement of a cleaning device in the airlock compartment is that the lid can be cleaned and prepared for introduction into a hygienic environment, whilst the filling of the can can take place at the same time in the hygienic compartment. This results in shorter process times.

The airlock compartment preferably comprises an inclined base. The base further comprises, during normal use of the machine, a drainage opening at the lowest point of the base.

The drainage opening serves for the discharge of cleaning agent to the outer environment of the airlock compartment. For this purpose, the drainage opening must be sealed gas-tightly from the outer environment. This can be effected, for example, by means of a device such as a siphon, a valve, or a container which is to be emptied. In the region of the lowest point of the base, a drainage opening can be in the base but also in the wall of the airlock compartment, near the base. This is possible to the extent that a build-up of the cleaning agent does not occur at the drainage opening in the wall and undelayed drainage through the drainage opening is possible.

Used cleaning agent can advantageously be removed from the airlock compartment simply and quickly by means of the drainage opening.

An elevated or reduced pressure can preferably be applied to an inner space of the hygienic compartment and/or an inert atmosphere can be applied.

In this way, the number of bacteria in the inner space of the hygienic compartment can be reduced in such a way that both the filling and the sealing of the cans can take place under hygienic conditions and the shelf life of the filling material is extended. The number of bacteria can be reduced, for example, by means of a cleaning device arranged in the hygienic compartment in order then to prevent the number of bacteria from rising again by means of elevated or reduced pressure and/or in an inert atmosphere. The cleaning device can comprise gaseous, liquid, or solid cleaning agents, particle radiation or electromagnetic radiation, or a mechanical device. Mechanical devices can be brushes, sponges, scrapers, etc.

A can can preferably be fully or partially introduced into the hygienic compartment. If it is only partially introduced, at least one sealing element is arranged at the hygienic compartment for sealing the hygienic compartment with respect to the can.

The advantage is that the design of the hygienic compartment can be adapted to the individual requirements.

A lid-aligning device preferably is or can be integrated into the hygienic compartment which serves to align a lid with respect to a can. The lid-aligning device comprises one or more sensors and a lid-rotating device or one or more sensors and a can-rotating device. The lid-aligning device can, however, also comprise one or more sensors and a lid-rotating device and a can-rotating device.

The sensors can be optical or mechanical sensors which detect markers on the can or can lid. Markers can be colors, text, shapes, codes, images, surface protrusions, or arrangements such as can-opening devices, etc. If a marker is detected by means of a sensor, the lid-rotating device performs a corresponding rotation of the lid and/or can by means of a control system until the predefined appearance is obtained.

The advantage of an integrated or integratable lid-aligning device consists in alignment between the lid and can can take place during the filling process such that a uniform appearance is obtained for all the sealed cans. An extra process step can be saved with the aid of this device and the process time and process costs are reduced.

The object is further achieved by a method for filling and sealing cans under hygienic conditions, in particular with a machine as described above.

The method comprises the following steps:

a) inserting a can via an airlock into a hygienic compartment
b) filling the can
c) applying a lid to the can
d) removing the can via an airlock from the hygienic compartment.

The lid can thus be introduced into the hygienic compartment before, during, or after step b).

If the lid is introduced into the hygienic compartment before step b), it can either be introduced into the hygienic compartment separately from the can before, during, or after the can is introduced into the hygienic compartment or be introduced into the hygienic compartment together with the can, for example by being applied to the can.

The advantage of the method is that it makes it possible for the can to be filled and sealed under hygienic conditions in a very time-efficient fashion.

In the method, the step of introducing the lid preferably comprises the following constituent steps:

introducing a can lid into an airlock compartment
cleaning the can lid in the airlock compartment
inserting the can lid via an airlock into the hygienic compartment.

The advantage of the method is that the can lid is prepared for hygienically sealing the can in parallel to the filling process of the can. Time and expense can be saved as a result.

The object is further achieved by means of a lid-applying device for the can filling. The lid-applying device comprises a lid-transporting device, a holding-down arrangement, and a seaming device. However, the lid-applying device can further also comprise a lid-transporting device and a holding-down arrangement or a lid-transporting device and a seaming device. The lid-applying device is characterized in that it can be introduced into a hygienic compartment. It is further designed in such a way that it can be introduced in a machine for filling and sealing cans under hygienic conditions. At the same time, it can be moved when the can situated in the machine moves.

The advantage of the lid-applying device is that it can be introduced into an already existing can-filling machine. As a result, a machine which fills cans can be upgraded to form a machine which additionally applies a can lid to the can under hygienic conditions and, depending on how it is equipped, also seals the can at the same time. Time and expense are saved here.

The invention is explained further below with the aid of exemplary embodiments in drawings, in which.

Figure 3A:
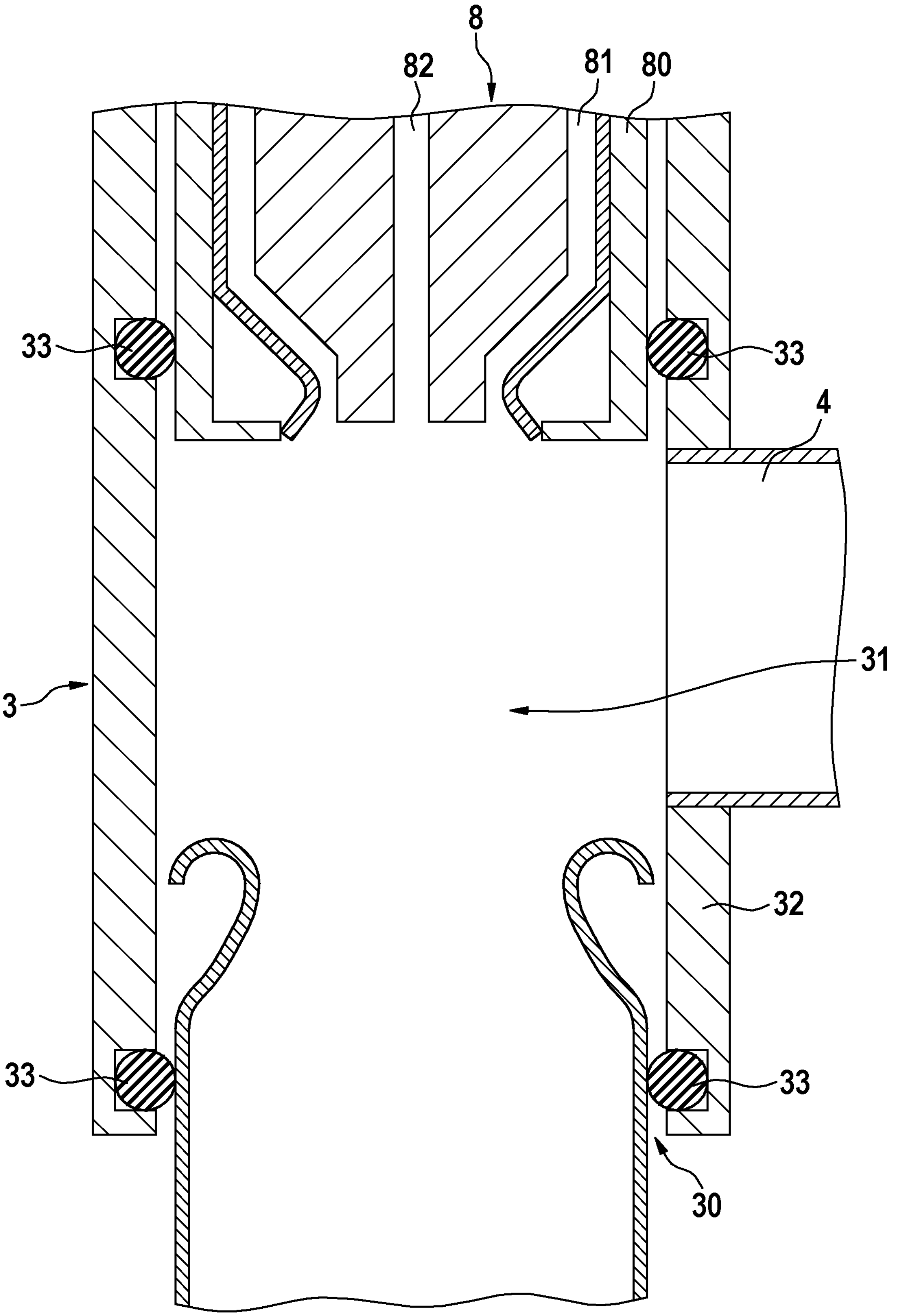
Figure 3B:
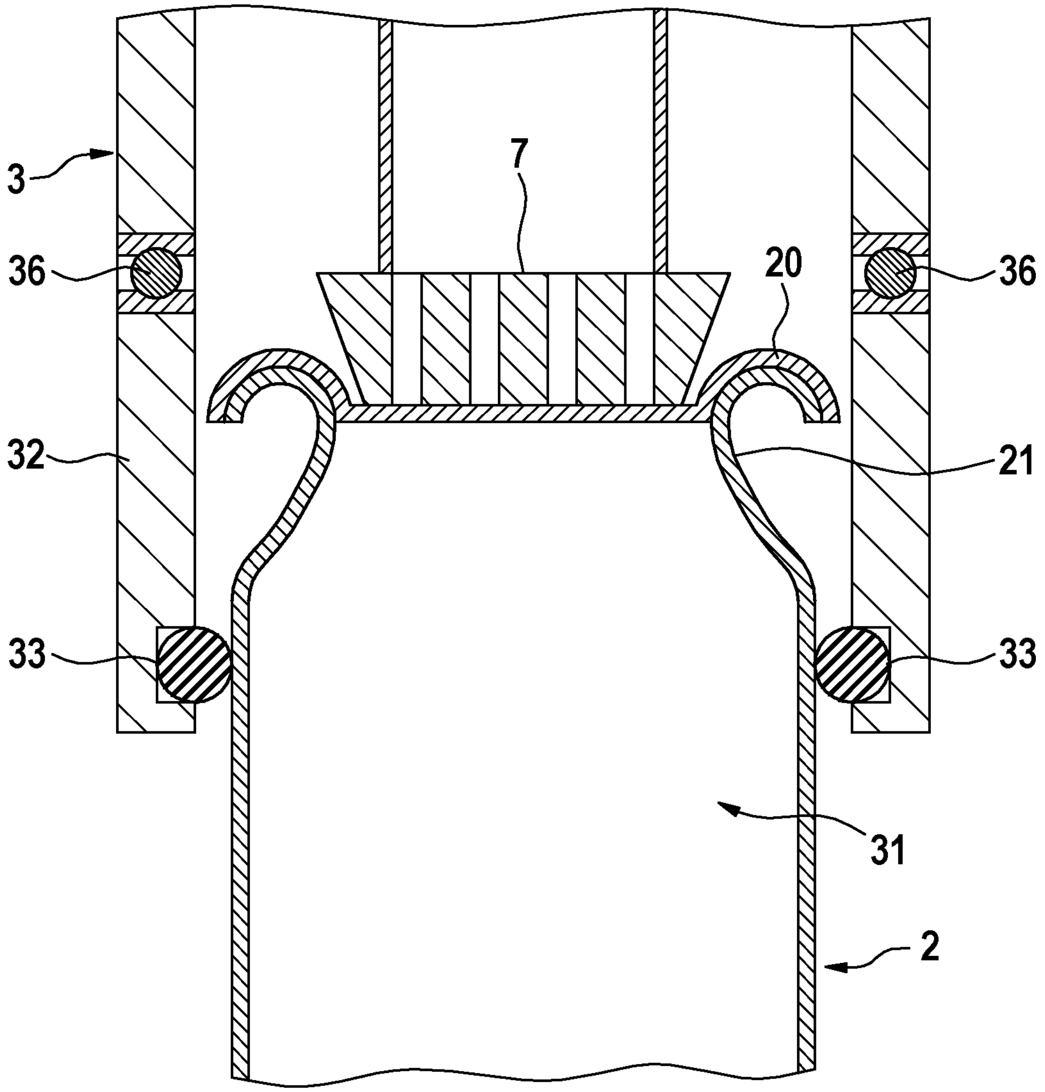
Figure 3C:
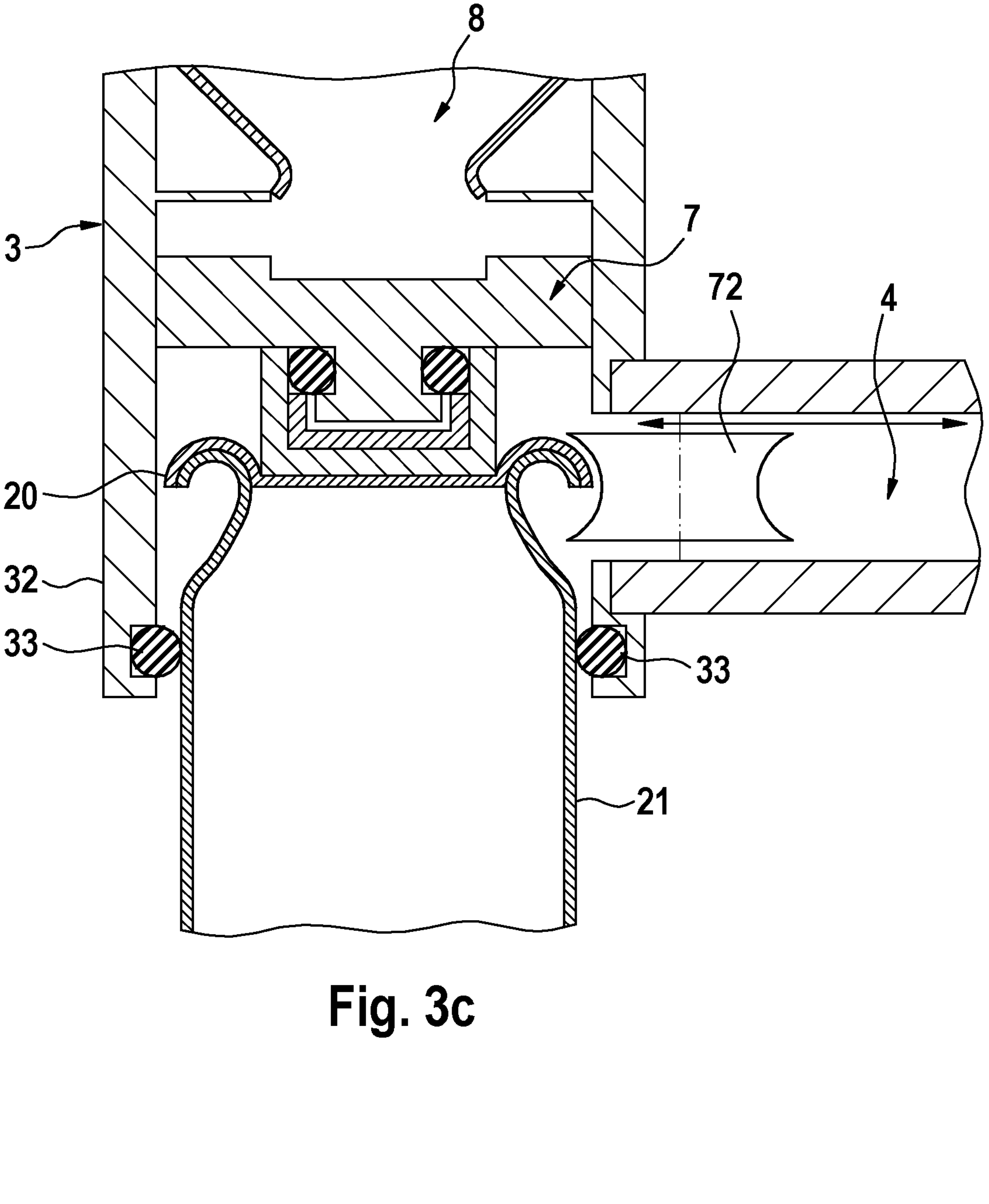
Figure 4:
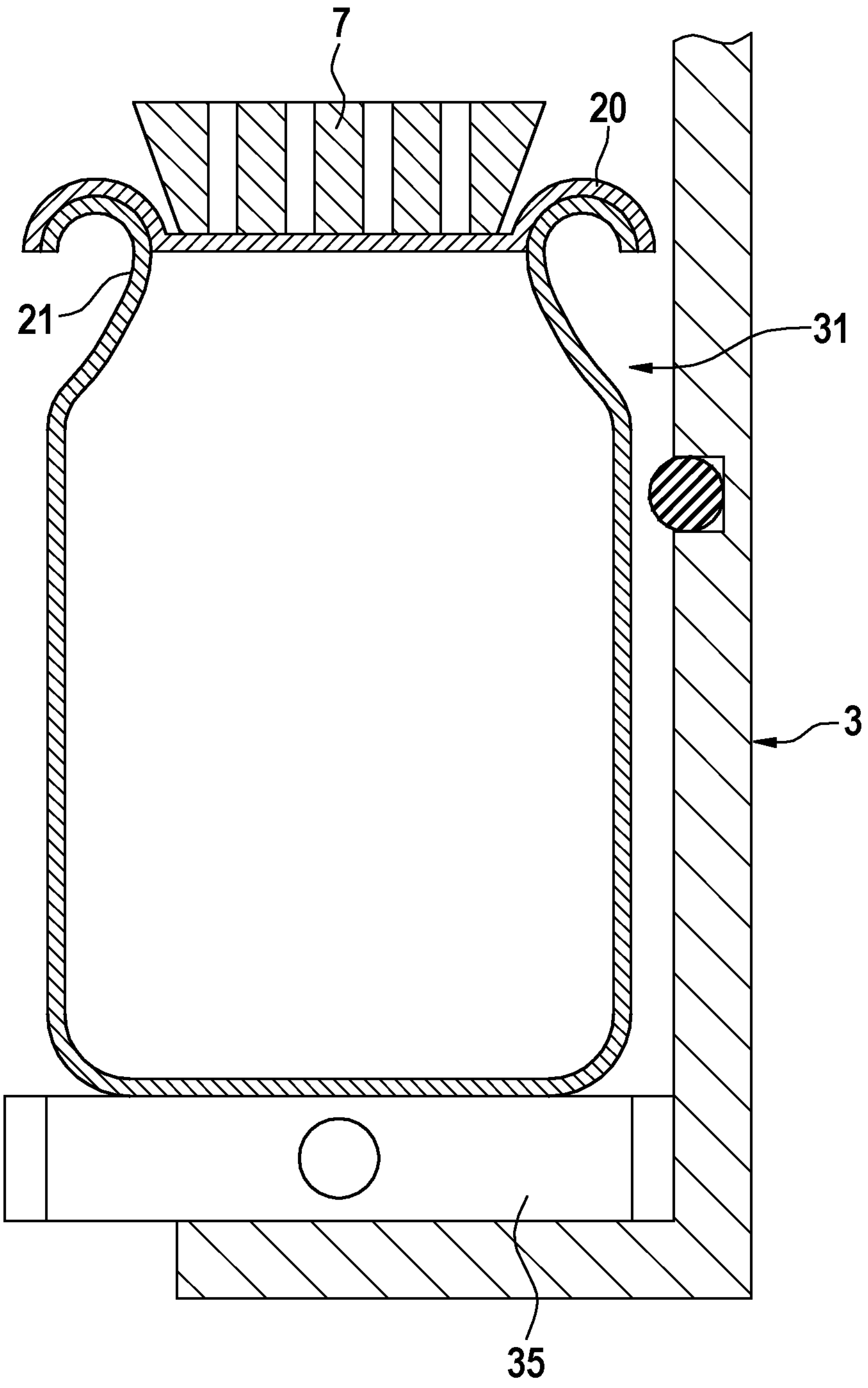
Figure 5A:
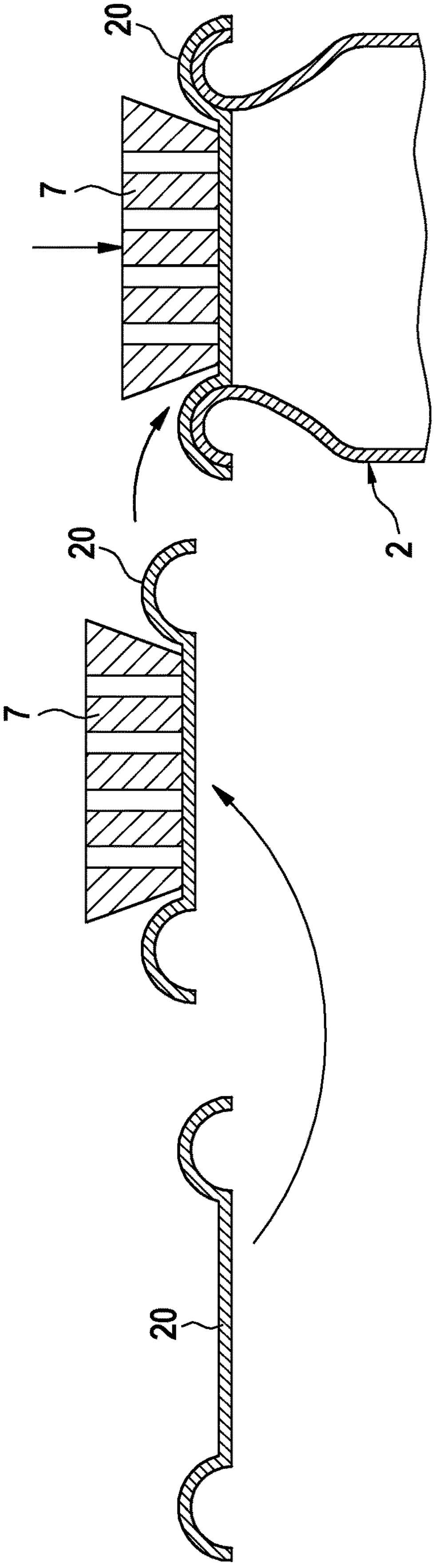
Figure 5B:
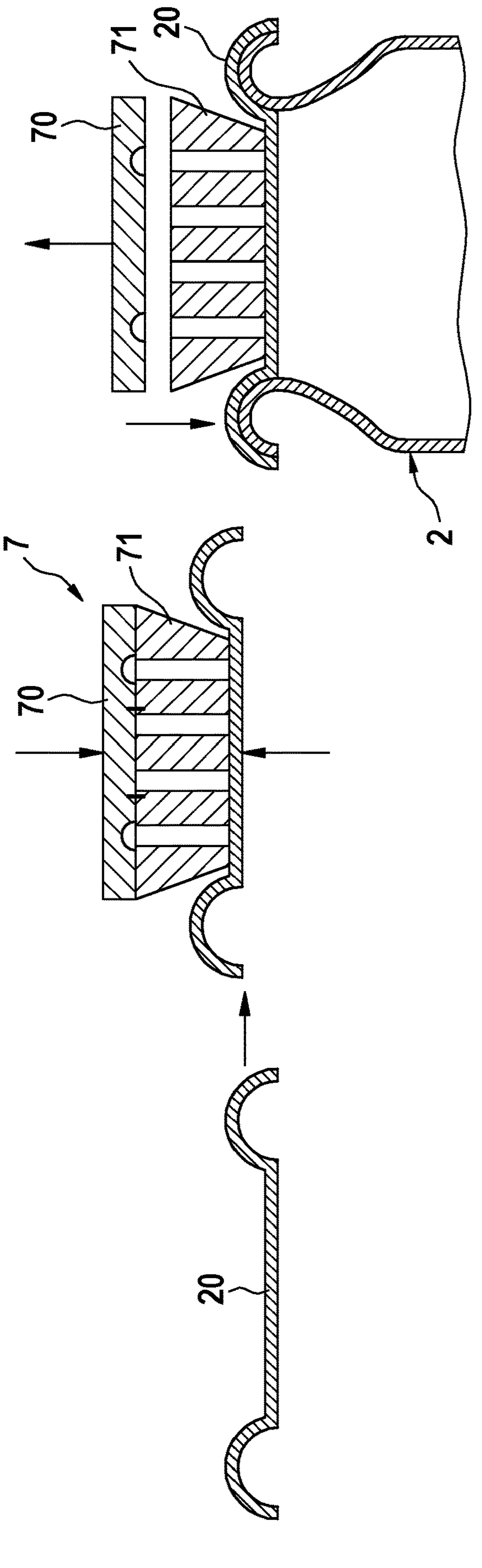
Figure 5C:
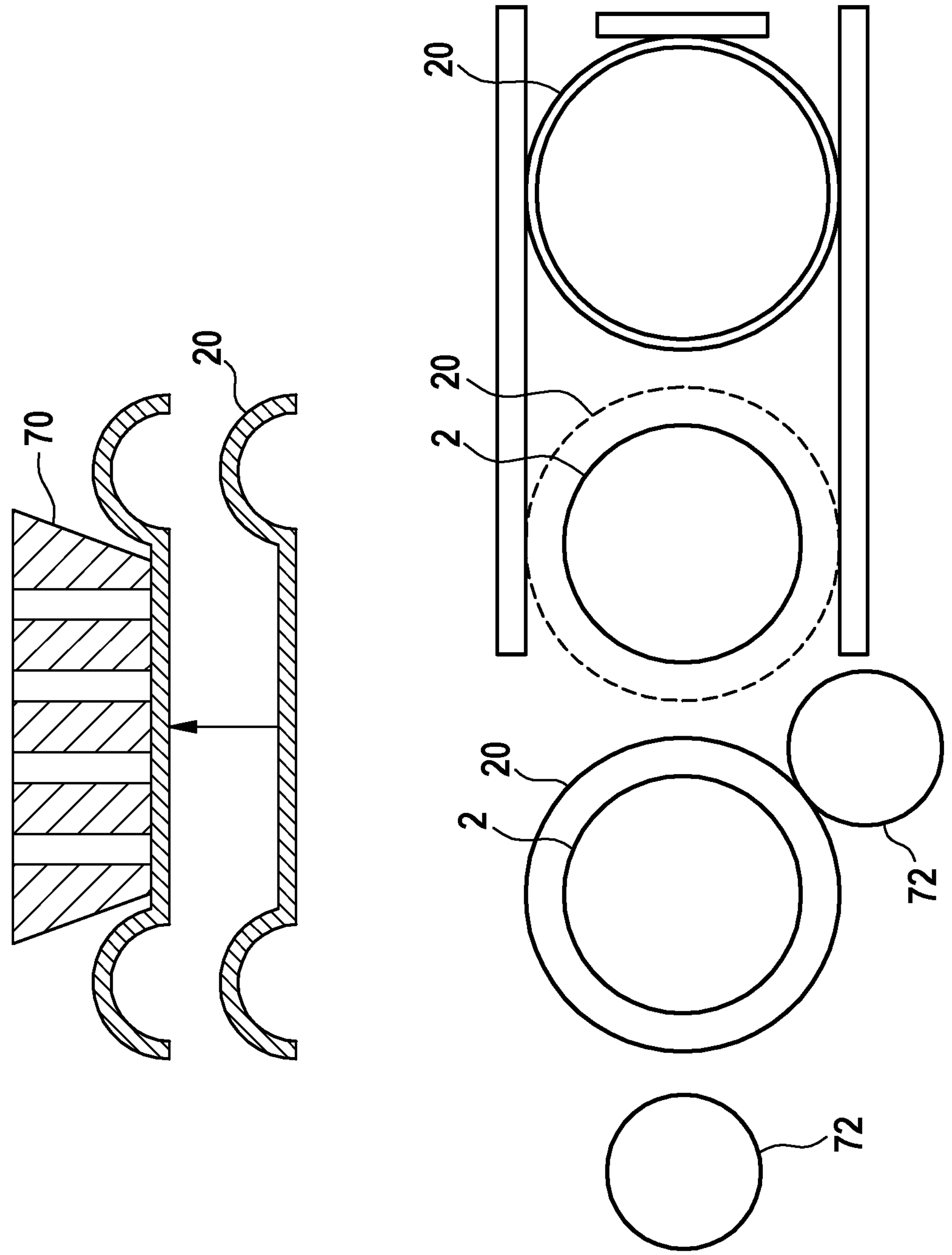
Figure 5D:
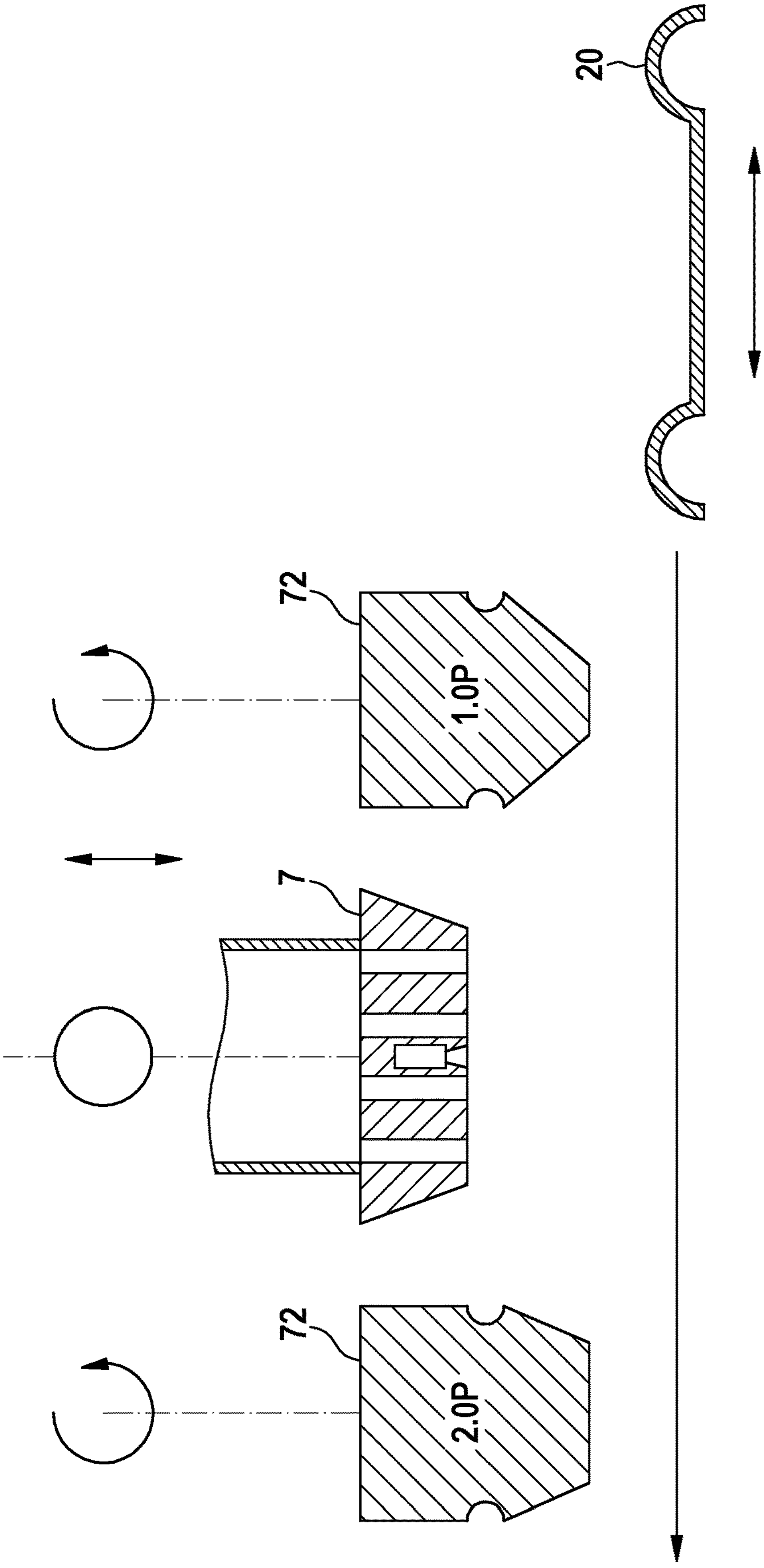
Figure 6A:
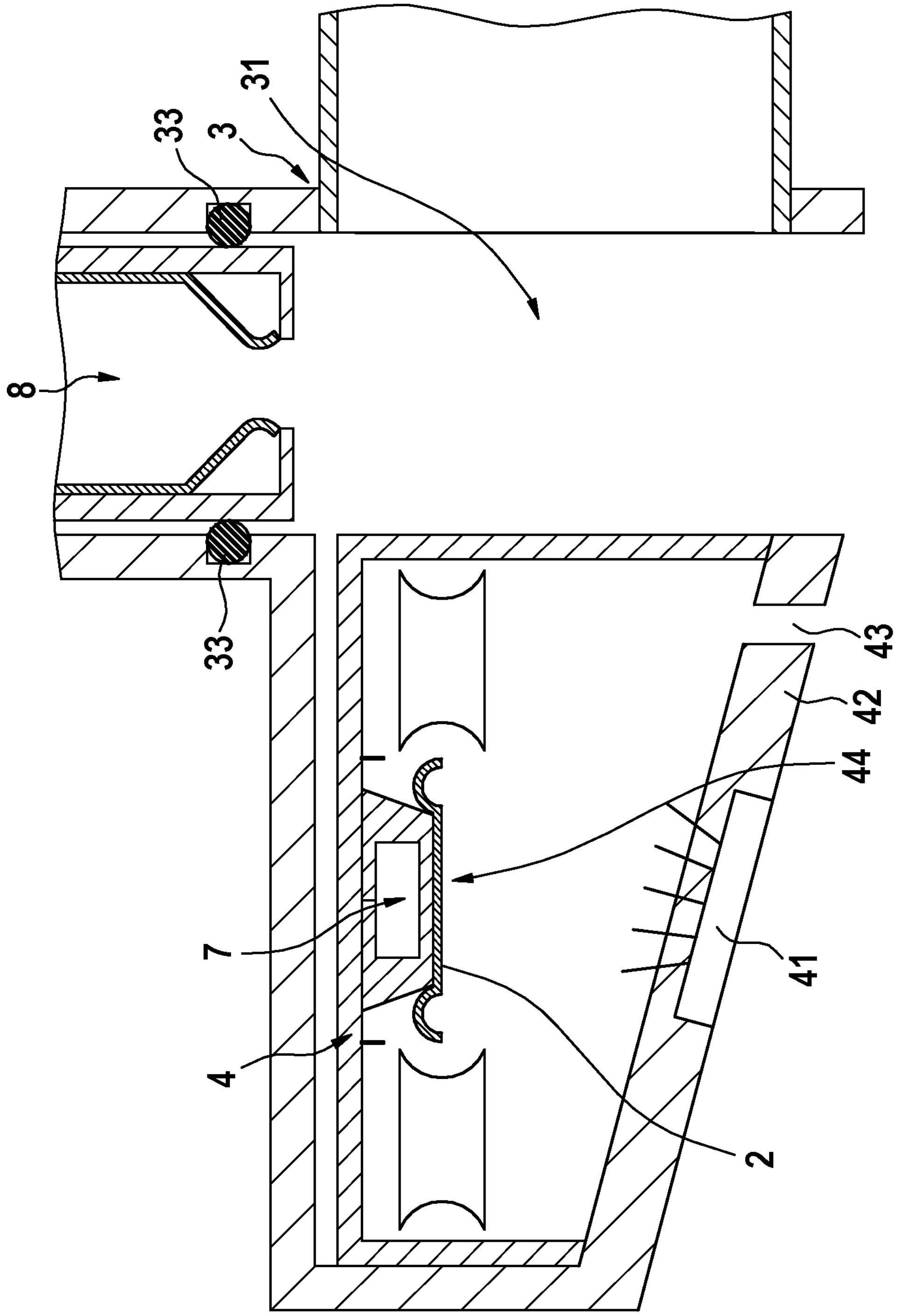
Figure 6B:
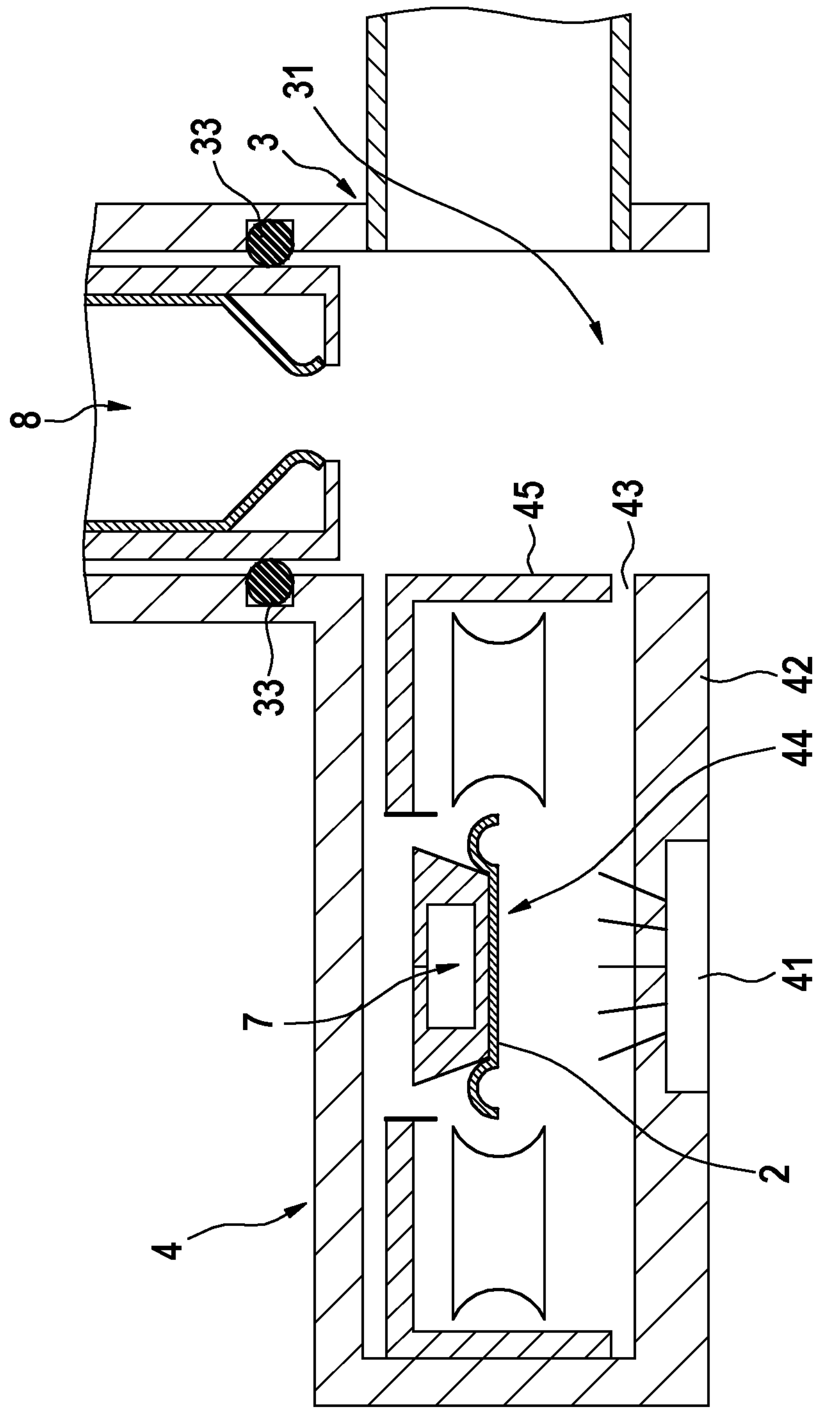
Figure 7:
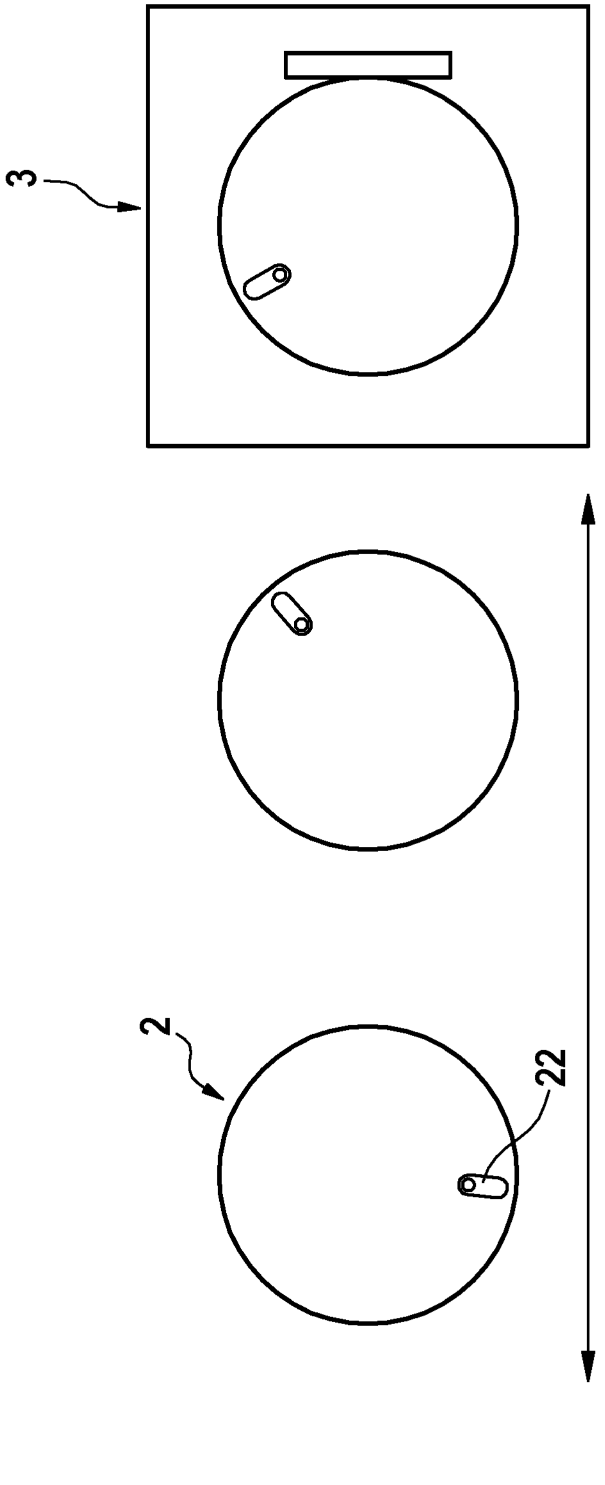
Figure 8:
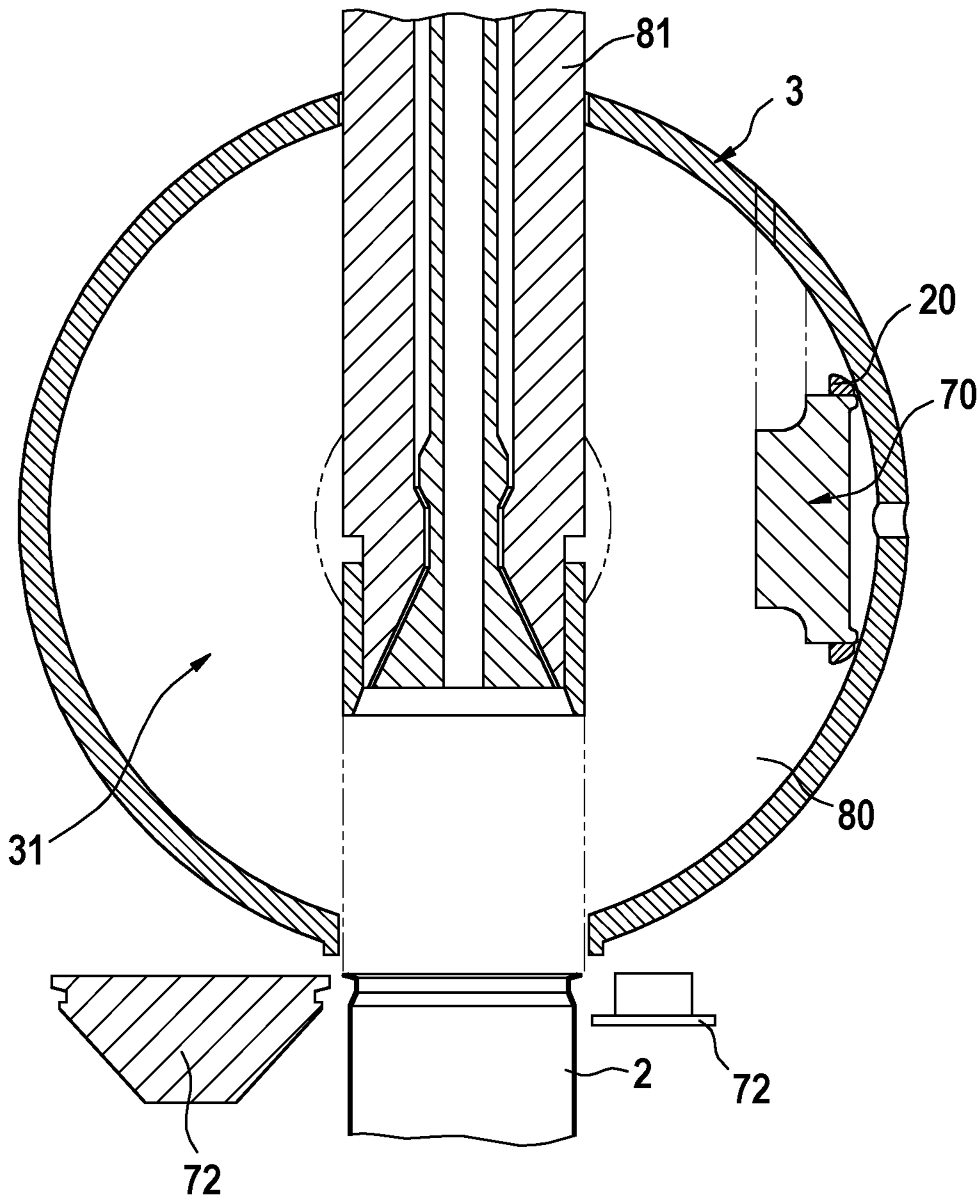

FIG. 3*a* shows a schematic view of a hygienic compartment in a first embodiment, FIG. 3*b* shows a schematic view of a hygienic compartment in a second embodiment, FIG. 3*c* shows a schematic view of a hygienic compartment in a third embodiment, FIG. 4 shows a schematic view of a weighing device integrated into an embodiment of a hygienic compartment, FIG. 5*a* shows a schematic view of a lid-applying device in a first embodiment, FIG. 5*b* shows a schematic view of a lid-applying device in a second embodiment, FIG. 5*c* shows a schematic view of a lid-transporting process and a lid-sealing process, FIG. 5*d* shows a schematic view of a side view of a seaming device, FIG. 6*a* shows a schematic view of a first embodiment of an airlock compartment, FIG. 6*b* shows a schematic view of a second embodiment of an airlock compartment, FIG. 7 shows a schematic view of a lid-aligning process, FIG. 8 shows a schematic view of a hygienic compartment in a fourth embodiment.

Figure 1:
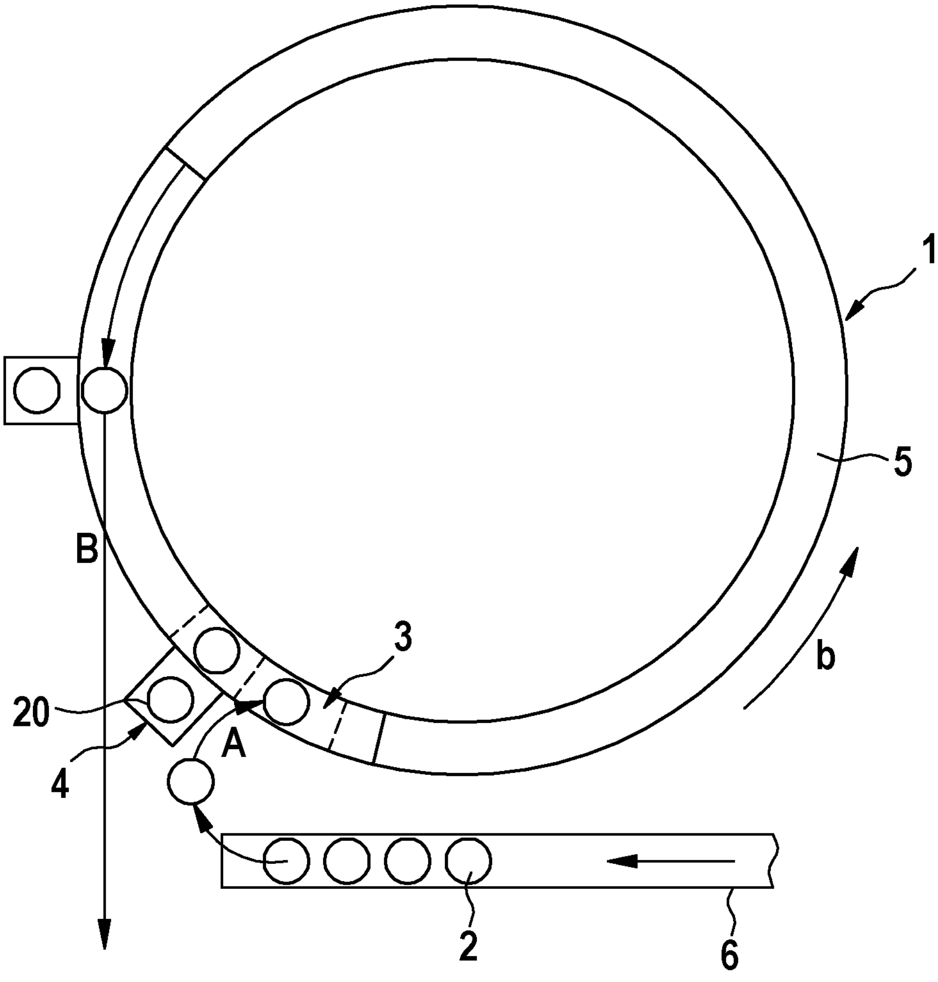
FIG. 1 shows a schematic view of a machine in a first embodiment.

A machine 1 illustrated in FIG. 1 serves to automatically fill and seal cans 2. The machine 1 comprises hygienic 3 compartments and airlock compartments 4 which move on a radial transport path 5. Each can 2 is transferred by means of a delivery device 6 at the position A into a respective hygienic compartment 3 and moved along the transport path 5 in the direction of movement b. The airlock compartment 4 is arranged at a hygienic compartment 3. The airlock compartment 4 contains a can lid 20, wherein a can lid 20 is introduced into the hygienic compartment 3 after the can 2 has been filled in order to seal the filled can 2. At position B, the filled and sealed can 2 leaves the hygienic compartment 3 and the transport path 5.

Figure 2:
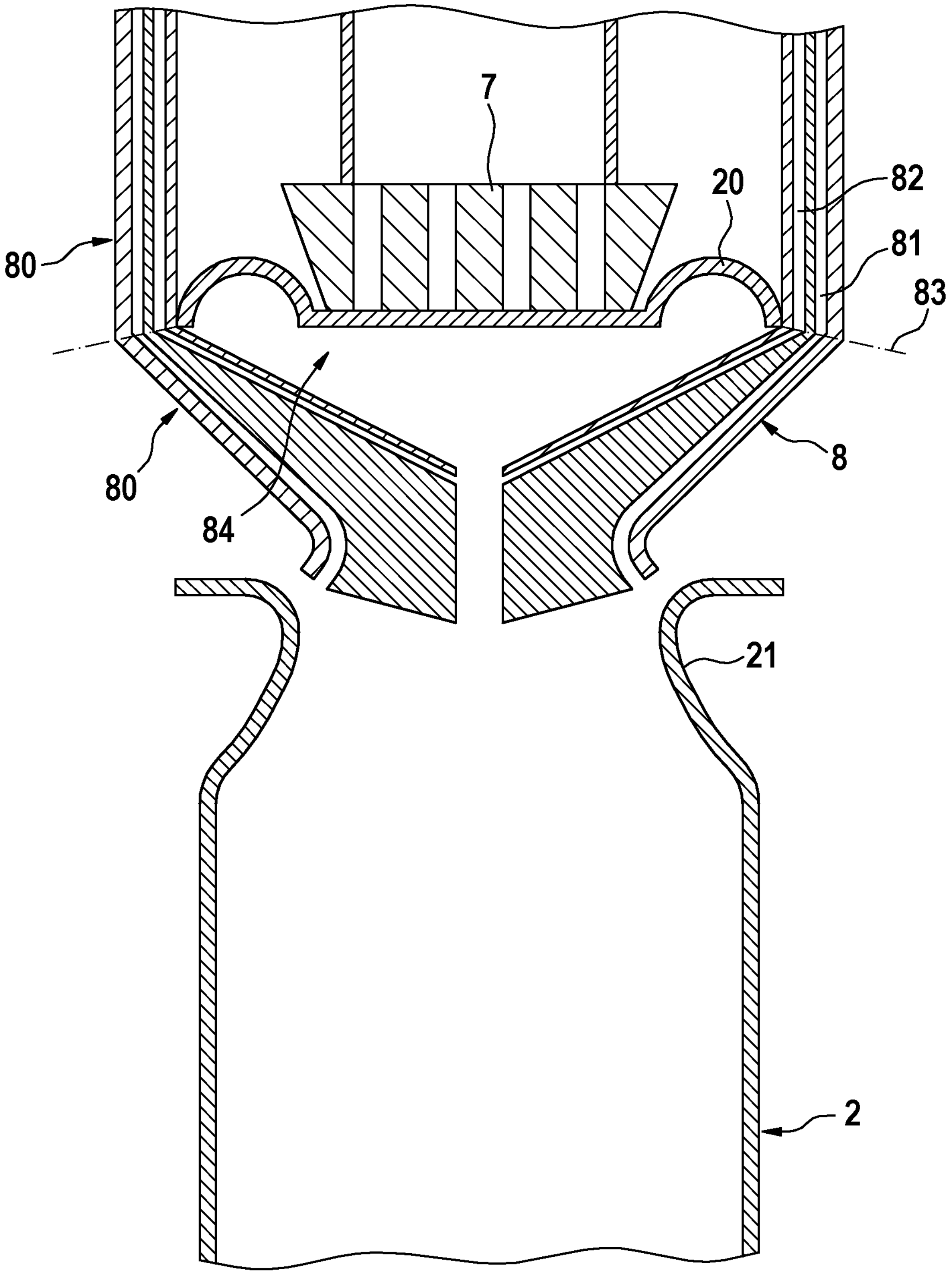
FIG. 2 shows a schematic view of an embodiment of a filling device.

FIG. 2 shows a filling device 8 for filling the can 2. The filling device 8 comprises a filling material line 81, integrated into an outer wall 80, a gas line 82, and a folding mechanism 83 in the form of joints or hinges. An inner space 84 of the filling device 8 displays a lid-applying device 7 and a can lid 20 arranged on the lid-applying device 7. Filling material can be fed into the can 2 via the filling material line 81, and the inside of the can can be gassed before, during, or after the filling by supplying gas by means of the gas line 82. The outer wall 80 can be folded partially outward with the aid of the folding mechanism 83. The can lid 20 can be applied to the can wall 21 by means of the lid-applying device 7 via the opening which is created.

FIGS. 3*a*, 3*b*, and 3*c* show different embodiments of a hygienic compartment 3.

FIG. 3*a* shows a hygienic compartment 3 which comprises a filling device 8 and sealing elements 33. An airlock compartment 4 is arranged on a wall 32 of the hygienic compartment 3. The sealing elements 33 seal the inner space 31 of the hygienic compartment 3 relative to the environment.

FIG. 3*b* shows an embodiment of the compartment 3 comprising a lid-applying device 7, a rotation mechanism 36, and sealing elements 33. The lid-applying device 7 is arranged in the inner space 31 of the hygienic compartment 3, whilst the rotation mechanism 36 is integrated into the walls 32 of the hygienic compartment. The can 2 can be rotated in the inner space 31 of the hygienic compartment 3 relative to the compartment 3 by means of the rotation mechanism 36 and can be seamed to the lid 20 held by the rotatable lid-applying device 7 by means of the application of a seaming device 72 (seaming device 72 not shown in FIG. 3*b*). The lid-applying device 7 applies the can lid 20 to the can wall 21 before the seaming.

FIG. 3*c* shows a hygienic compartment 3 which comprises a filling device 8, a lid-applying device 7, and sealing elements 33. An airlock compartment 4 is arranged on a wall 32 of the hygienic compartment 3. A seaming device 72 is integrated into the airlock compartment 4. The can lid 20 can be applied to the can wall 21 by means of the lid-applying device 7. Sealing of the can 2 is carried out with the aid of the seaming device 72. The seal 33 is thus detached from the can 2, the lid 20 and the can 2 are rotated and the seaming device 72 is brought into contact with the lid 20 and the can 2.

A weighing device 35 is shown in FIG. 4. The weighing device 35 is integrated into the inner space 31 of a hygienic compartment 3 and serves to determine the filling amount of a filling material.

FIGS. 5*a*, 5*b*, 5*c* show different embodiments of a lid-applying device 7.

FIG. 5*a* shows the transporting of a lid 20 to a can 2 by means of a lid-applying device 7. In a first step, the lid 20 is picked up by the lid-applying device 7 by means of a holding mechanism. In a second step, the lid-applying device 7 transports the lid 20 over a can 2 and moves the lid downward until it lies on the can 2. Instead of the lid being lowered onto the can, the can can also be lifted to the lid until the lid lies on the can.

FIG. 5*b* shows the transporting and holding of a lid 20 on a can 2 by means of a lid-applying device 7 which comprises a lid-transporting device 70 and a holding-down arrangement 71. In a first step, the lid 20 is picked up by the lid-applying device 7 by means of a holding mechanism. In a second step, the lid-transporting device 70 transports the lid 20 over the can 2 and moves the lid downward until it lies on the can 2. Instead of the lid being lowered onto the can, the can can also be lifted to the lid until the lid lies on the can. In a third step, the holding-down arrangement 71 holding the lid is separated from the lid-transporting device 70.

FIG. 5*c* shows the sealing of a can 2 to a lid 20 by means of a lid-applying device 7. The lid-applying device 7 comprises a lid-transporting device 70 and a seaming device 72. The lid 20 is first picked up by the lid-transporting device 70 by means of a holding mechanism. The lid-transporting device 70 then transports the lid 20 over a can 2 and moves the lid downward until it lies on the can 2. Instead of the lid being lowered onto the can, the can can also be lifted to the lid until the lid lies on the can. The lid-transporting device 70 releases the lid 20 and moves upward again. In a further step, the can 2 is sealed to the lid 2 with the aid of the seaming device 72.

The holding mechanism in FIGS. 5*a*, 5*b*, and 5*c* can, for example, be a suction mechanism or magnetic.

FIG. 5*d* shows a seaming device 72 and a lid-transporting device 70. The seaming device 72 comprises two rotatable seaming tools by means of which a first and a second seaming operation can be executed on the can 2 and its applied lid 20. The lid-transporting device 70 transports the lid 20 to the can 2 which is situated between the two seaming tools.

FIGS. 6*a* and 6*b* show different embodiments of an airlock compartment 4.

FIG. 6*a* shows an airlock compartment 4 which comprises a lid-applying device 7 and a cleaning device 41. The lid-applying device 7 is arranged in an upper region 44 of the airlock compartment 4 and the cleaning device 41 is integrated into an inclined base 42 of the airlock compartment 4. A drainage opening 43 is also integrated into the base 42. The airlock compartment 4 can be moved into an inner space 31 of a hygienic compartment 3 by means of a pusher mechanism.

FIG. 6*b* shows an airlock compartment 4 which comprises a lid-applying device 7 and a cleaning device 41. The lid-applying device 7 is arranged in an upper region 44 of the airlock compartment 4 and the cleaning device 41 is integrated into a base 42 of the airlock compartment 4. A drainage opening 43 is integrated into a wall 45 of the hygienic compartment 4 close to the base 42. The airlock compartment 4 can be moved into an inner space 31 of a hygienic compartment 3 by means of a pusher mechanism.

The cleaning device 41 in FIGS. 6*a* and 6*b* can, for example, be a radiation source or a cleaning agent.

FIG. 7 shows a can lid 2 with a lid marker 22 in the form of an opening tab. The lid marker 22 is brought into a desired position by means of a rotational movement before, during, or after its entrance into a hygienic compartment 3.

FIG. 8 shows a hygienic compartment 3 with two opposite openings in an outer wall 80. A filling material line 81 can be integrated into one opening and a can 2 which is open at an end facing an inner space 31 of the hygienic compartment 3 can be introduced into the other opening. A lid-transporting device 70 is arranged on an inner wall of the hygienic compartment 3. The lid-transporting device 70 can pick up a can lid 20 and move along the inner wall of the hygienic compartment 3 until it is over the opening of the can 2. Over the opening of the can 2, the lid-transporting device 70 moves the lid 20 downward and deposits it on the can 2. A seaming device 72, which seals the can lid 20 to the can 2, is arranged on the outer wall 80 of the hygienic compartment 3 next to the opening for introducing the can 2.

The invention claimed is:

1. A machine for filling and sealing cans under hygienic conditions, comprising:

a hygienic compartment, a lid-applying device, and an inlet opening for filling material, wherein the lid-applying device is arranged in the hygienic compartment and the inlet opening is formed on the hygienic compartment, the machine is designed in such a way that, during use, one or more cans can, in each case, be associated with the hygienic compartment in such a way that the hygienic compartment is moved in the machine together with the can or cans, an airlock compartment, a weighing device for determining the filling amount of the can.

2. The machine according to claim 1, wherein the weighing device determines when a predetermined weight has been reached.

3. The machine according to claim 1, wherein the weighing device is integrated into the inner space of the hygienic compartment.

4. The machine according to claim 1, wherein a filling device is formed at the inlet opening or the filling device is introduced in the inlet opening.

5. The machine according to claim 1, wherein the filling device comprises a flow sensor for determining a filling amount.

6. The machine according to claim 1, wherein the lid-applying device comprises:

a lid-transporting device, and a holding-down arrangement and a seaming device.

7. The machine as claimed in claim 1, wherein the airlock compartment is arranged on the hygienic compartment.

8. The machine as claimed in claim 7 wherein the airlock compartment comprises an inclined base, wherein, during normal use of the machine, a drainage opening is arranged in a region of the lowest point of the inclined base.

9. The machine according to claim 1, wherein lids are transported by a lid-transporting device on a transport path from the airlock compartment into the hygienic compartment.

10. The machine according to claim 1, wherein one or more entrances and exits are arranged on the airlock compartment.

11. The machine according to claim 1, wherein the airlock compartment comprises a cleaning device.

12. The machine according to claim 1, wherein an elevated or reduced pressure is applied to an inner space of the hygienic compartment and an inert atmosphere is applied to the inner space.

13. The machine, according to claim 1, wherein a can is fully or partially introduced into the hygienic compartment, in the latter case, at least one sealing element is provided at the hygienic compartment for sealing the hygienic compartment with respect to the can.

14. The machine according to claim 1, wherein a lid-aligning device, for aligning a lid with respect to a can, is integrated into the hygienic compartment, the lid-aligning device comprises:

one or more sensors; and a lid-rotating device and a can-rotating device.

15. The machine according to claim 1, wherein the lid-applying device comprises:

a lid-transporting device; and a holding-down arrangement or a seaming device.

16. The machine according to claim 1, wherein an elevated or reduced pressure is applied to an inner space of the hygienic compartment or an inert atmosphere is applied to the inner space.

17. The machine according to claim 1, wherein a lid-aligning device for aligning a lid with respect to a can is integrated into the hygienic compartment, and the lid-aligning device comprises one or more sensors; and a lid-rotating device or a can-rotating device.

* * * * *